United States Patent [19]
Briscall et al.

[11] Patent Number: 5,424,894
[45] Date of Patent: Jun. 13, 1995

[54] ELECTRICAL LINE-FAULT DETECTOR AND CIRCUIT BREAKER DEVICE

[76] Inventors: W. Brian Briscall, 336 Pine Hill Rd., Elizabethton, Tenn. 37643; Gerald C. Laxen, 12800 W. 10th St., Indianapolis, Ind. 46234

[21] Appl. No.: 890,652
[22] Filed: Nov. 24, 1992
[51] Int. Cl.⁶ .............................................. H02H 3/16
[52] U.S. Cl. ....................................... 361/45; 361/86; 361/89
[58] Field of Search ................................ 361/42–50, 361/86, 88, 89

[56] References Cited
U.S. PATENT DOCUMENTS

| | | | |
|---|---|---|---|
| 3,386,004 | 5/1968 | Dwyer | 361/42 |
| 3,648,111 | 3/1972 | Howe | 361/42 |
| 3,780,348 | 12/1973 | Loukidis | 361/42 |
| 4,012,668 | 3/1977 | Wittlinger | 361/44 |
| 4,079,344 | 3/1978 | Lauben et al. | 335/2 |
| 4,216,516 | 8/1980 | Howell | 361/45 |
| 4,329,727 | 5/1982 | Premerlani | 361/80 |
| 4,346,307 | 8/1982 | Zulaski | 361/86 |
| 4,517,619 | 5/1985 | Uekubo | 361/64 |
| 4,574,324 | 3/1986 | Packard | 361/46 |
| 4,816,957 | 3/1989 | Irwin | 361/45 |
| 4,868,704 | 9/1989 | Cavero | 361/80 |
| 4,979,070 | 12/1990 | Bodkin | 361/42 |

Primary Examiner—Brian K. Young
Assistant Examiner—Ronald W. Leja
Attorney, Agent, or Firm—Woodard, Emhardt, Naughton, Moriarty & McNett

[57] ABSTRACT

An electrical circuit breaker device for connection between a load device and a power source, capable of disconnecting the load device from the power source upon detection of an electrical fault condition present in the wiring between the load and the power source is provided. A time delay prevents the load from being disconnected due to the reporting of a temporary voltage fluctuation. One embodiment of the present invention measures a voltage value representative of the voltage across the source and compares it with the voltage drop across the load to determine the voltage drop due to the wiring between the source and the load. The load device is disconnected from the power source if the resulting power loss or voltage difference due to the resistance of the wiring indicates a power loss in the wiring sufficient to cause combustion. Another embodiment of the present invention compares an arbitrary voltage to the voltage drop across the load device to determine whether a fault condition exists within the wiring, and if such a fault condition is detected, the load device is disconnected from the power source.

43 Claims, 5 Drawing Sheets

ELECTRICAL LINE-FAULT DETECTOR AND CIRCUIT BREAKER DEVICE

BACKGROUND OF THE INVENTION

This invention concerns a device and method for interrupting, i.e., breaking an electrical supply circuit to terminate current flow therethrough in response to the detection by the device of a fault located within the wiring connecting the load device and a power source which in one example is manifested as an atypical voltage at the load device end of the circuit when compared to the source voltage.

Electrical circuits of buildings of all types, particularly residences, which typically employ insulated wiring or cable are susceptible to damage, deteriorated connections, or the overloading of extension cords which generate sufficient electrical resistance to ignite the electrical insulation or adjacent building structure such as wood studs, rafters, wall board or the like. Such damage can occur, for example, during construction or remodeling of a residence whereby a nail, screw or the like may be driven into the wiring and diminish its current capacity. Such damage can go unnoticed during the operation of a lamp, power tool, electrical heater or the like even though the increased resistance in the damaged area may be generating heat and sparks inside a wall or the like and may start a hidden fire. More often, however, it is thermal expansion and contraction, presence of moisture, or dissimilar metal corrosion which causes connections in circuits serving higher amperage devices and appliances to develop resistance and heat.

Heretofore, considerable effort has been directed toward protecting the individual from electrical shock resulting from short circuiting or the like of the equipment being used, or toward protecting the equipment itself, i.e., protected circuit, by means of circuit breaking devices which measure current at a single point near the electrical breaker and interrupt power to the equipment when an abnormal electrical condition occurs. However, fires often begin with perfectly functioning current limiting circuit breakers in place. The detection of certain fault conditions, such as a moderate to high resistance fault in the wiring in the walls of a building, may elude detection by the traditional means and result in serious fire risks.

Various devices and methods which have been devised for protecting against ground fault and the like are shown, for example, in U.S. Pat. Nos. 3,780,348; 4,012,668; 3,648,111; 4,979,070; 3,386,004; 4,079,344; 4,816,957; 4,216,516; and 4,574,324. None of this prior art, however, is directed to disconnecting a load device from the electrical circuit of a residence or other building upon detecting a damaged line or oxidized connection within the circuit which could lead to resistive heating and incendiary conditions.

There is a need for a device that will detect fire-causing electrical conditions within the internal wiring of a circuit connected between a load device and the power supply of a residence or other such building and in response to such detection, will disconnect the load device from the circuit. Additionally, there is a need for a device to disconnect a load device from a power supply upon the detection of a fault condition that can distinguish between an actual fault within said supply circuit and a transitory, short-lived voltage or current aberrations existing within the power source of the supply circuit and can delay shut-down of the supply circuit for a predetermined power source connection period.

Further, there is a need for a device that can determine whether a fault condition exists within the wiring to prevent some of the fires which occur with prior art designs.

SUMMARY OF THE INVENTION

Briefly describing one aspect of the present invention an electrical circuit breaker apparatus is provided for comparing a first electrical parameter, such as voltage, current or power, representative of the value in volts, amps or watts of that electrical parameter present at the power source with a corresponding electrical parameter measured at the load device to determine whether a fault is present in the wiring between the power source and the load device. Additionally the electrical circuit breaker apparatus is designed to open the circuit between the load device and the power source in response to the detection of a fault condition.

Another aspect of the present invention is to provide an electrical circuit breaker device for detecting fire-causing electrical conditions within individual power supply circuits of a residence or other such building and in response to such detection, shutting down the circuit with respect to a load connected thereto. One feature of the present invention is to provide such a device with delay means for distinguishing between an actual fault within said supply circuit and a temporary, short-lived voltage or current aberration existing within the power source whereby said delay means can delay shut-down of said supply circuit for a predetermined power source correction period.

Another aspect of the present invention is to provide a device with a visual or audible indicator which is operative to warn of the existence of a fault condition and against further use of said faulty supply circuit.

A further aspect of the present invention is to provide a device which is compact, self-contained and can be plugged into an existing electrical outlet or can be integrated into the wiring layout of a building under construction or can be integrated into the design of a load device by the manufacturer.

A further aspect of the present invention is to provide an electrical circuit breaker device that can indicate a shorted load device attached to the circuit breaker device as well as a moderate to high resistance fault in the wiring.

Further objects and advantages of the present invention may be discerned by persons of ordinary skill in the art after reviewing the following written description and accompanying figures.

DESCRIPTION OF THE PREFERRED EMBODIMENT

Figure 1:
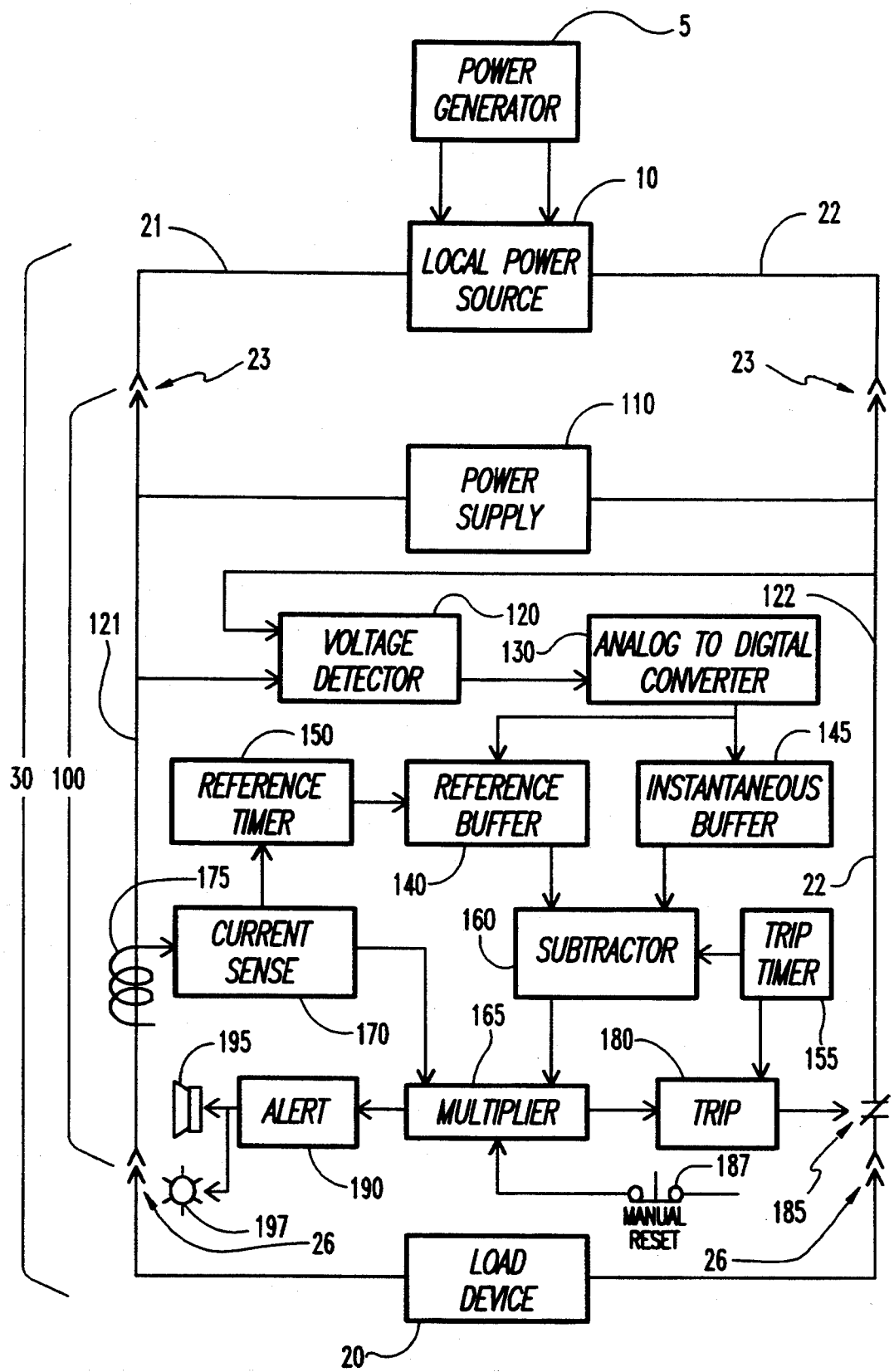
FIG. 1 is a diagram of an electrical circuit breaker device of a first preferred embodiment of the present invention for detecting a fault condition within the wiring connecting a power source in series with a load device and for disconnecting the load device from the power source upon detection of such a fault condition.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A first embodiment of the present invention, shown in FIG. 1, is a circuit breaker device 100 for connection between a local power source or source 10 and a load device or load 20 to detect a fault present in the wiring connecting the load device to the power source and for disconnecting the load device 20 from the local power source 10 upon detection of a fault connection. In FIG. 1 there is shown a system 30 containing a circuit breaker device 100 connected between a load device 20 and a power source 10. Local power source 10 is the internal power source for a residence or other building which is fed by an external power generator 5. The load device 20 is connected in series with the power source 10 via internal wiring conductors 21 and 22 and circuit breaker conductors 121 and 122. Internal wiring conductors 21 and 22 represent the internal wiring conductors of the building that connect the power source 10 in series with an individual load device 20. It is within internal wiring conductors 21 and 22 that a relatively high resistive or other kind of fault, such as a short, may occur. Under ideal conditions, the internal wiring of a circuit is presumed to produce no resistance to the flow of current therethrough, and as such there is no voltage drop due to the wire conductors. As such, in an ideal system the voltage drop due to the load when the load device is on should equal the voltage measured across the power source. Realistically, every circuit has some amount of loss due to line resistance. However, a voltage measured across the source much greater than the voltage drop due to the load device may indicate a relatively large resistance present within the wiring of the building. It is this type of fault that generates resistive heat that can start a fire within the walls of a building. Where there is a single dedicated load, a modified form of the invention can also be made which includes a comparison of currents at the source and load to determine if there is a shunt fault in the wiring of the building.

The circuit breaker device 100 of this first preferred embodiment operates to measure the voltage representative of the voltage at the source 10 and to compare it with the voltage measured across the load 20 when the load 20 is turned "on". Any large voltage difference between the source voltage and the load voltage may be indicative of a large voltage drop due to a fault in the wiring. A voltage detector 120, located at the load end of the system, continuously takes voltage readings across the load device. When the load device is switched "off" the circuit between the power source 10 and the load device 20 is open-circuited and no current flows through the system 30. With no current flowing through the system 30, there can be no voltage drops due to either a fault in the internal wiring conductors, typically a moderate to high resistance fault, or due to the load device. Thus, the voltage measured by the voltage detector 120 when the load is "off" is representative of the maximum voltage across the power source 10. When the load device is turned "on" and current is flowing through the system 30, the voltage detector 120 obtains a reading across the load device 20 that is representative of the maximum voltage drop due to the load device 20. Voltage detector 120 continuously takes voltage readings representative of the maximum voltage seen between conductors 121 and 122, whether or not current is flowing.

The voltage reading obtained from the voltage detector 120 is digitized by the analog-to-digital converter 130 and sent to an instantaneous buffer 145 and/or a reference buffer 140. Instantaneous buffer 145 is continuously updated with new data obtained by the voltage detector 120. Reference buffer 140 is used to store a digital representation of the maximum power source voltage. To obtain the source voltage the reference buffer should only be updated when the load device is "off" and no current is flowing through the system 30. Current sensing coil 175 constantly monitors conductor 121 for the presence of an electromagnetic force indicative of current flow through the system 30. Information from current sensing coil 175 is input to current sense 170 where the information is interpreted to determine whether current is flowing over conductor 121 and, if so, what the value of that current is. Current sense 170 also provides a digital representation of the current detected as flowing through the system 30 and can be adapted to compensate for the different power factors associated with alternating current. When the load is "off", current sense 170 enables a reference timer 150 to periodically allow the reference buffer to be updated with data input from the analog-to-digital converter 130 representative of the voltage across the source 10. In between periodic updates, the reference buffer is latched, storing only the most recent maximum source voltage value obtained from the analog-to-digital converter 130. When the load is turned "on", the source voltage in the instantaneous buffer is replaced by the instantaneous value of the voltage drop across the load device 20. The instantaneous buffer is continuously updated to reflect the instantaneous voltage drop across the load device 20.

Periodically the "on" load device 20 may be switched "off" by the circuit breaker device 100 for a fraction of a second so that the reference buffer 140 may be updated. In the preferred embodiment of the present invention the load device is switched off every five seconds for a fraction of a second to enable the reference buffer 140 to update. It is not necessary, however, for the load device to be switched "off" for one entire voltage cycle. As the cyclical form of the voltage curve is well known, the load device may be switched off for only a portion of its full cycle and the voltage maximum may be determined by approximating the maximum reached by the curve for the remainder of the cycle.

Additionally, non-resistive (inductive or capacitive) loads may not need to be switched "off" at all. Current sense 170 may be used to alert the reference timer 150 to those times in the alternating current cycle when the current is equal to zero and the power factor is not equal to 1. The reference timer 150 may then enable the reference buffer 140 to be updated with useful data without switching the inductive or capacitive load device 20 "off". However, if the power factor is equal to 1, then the load device may be switched "off" periodically as described herein.

The digitized voltage values stored in the instantaneous and reference buffers are relayed to a subtractor 160. Subtractor 160 functions to obtain a digital voltage difference representative of the voltage difference between the instantaneous voltage value (the voltage drop across the load 20) and the reference voltage value (the voltage across the source 10 with no current flowing through the system 30) to obtain a voltage difference value representative of a voltage drop due to resistance in the wiring conductors 21 and 22 connecting the load 20 and the source 10 in series. The voltage difference value is relayed from the subtractor 160 to a multiplier 165. Additionally, a digital representation of the current determined by the current sense 170 is relayed to the multiplier 165. The voltage difference value is multiplied by the current value relayed by the current sense 170 and the resulting product is representative of the power loss throughout the system 30 attributable to the resistance of the electrical wiring conductors 21 and 22. If the power loss value is above a threshold value predetermined to be of a level that may support combustion, a trip signal will be generated and sent to trip 180. Trip 180 causes breaker 185 to be opened, thus breaking the series connection between the load 20 and the power source 10. Breaker 185 and Trip 180 may be implemented using a solid state disconnect device. The trip signal generated at the multiplier 165 may also be sent to either an audible or a visible indicator to indicate that the load 20 has been disconnected from the power source 10. In this preferred embodiment of the present invention, the trip signal is additionally sent to alert 190 which will result in sounding horn 195 and lighting indicator lamp 197. Once a trip signal sent by the multiplier 165 has resulted in the opening of breaker 185, the trip value is locked into the multiplier 165 until the circuit breaker device 100 is manually reset. The circuit breaker device 100 may be manually reset by depressing manual reset 187, a normally closed switch, which clears the multiplier 165, allowing the breaker 185 to reclose. A continuing power loss above acceptable limits will prevent the sustained reclosure of breaker 185. If after depressing manual reset 187 the power loss value is within acceptable operating parameters, the multiplier 165 will send a signal to the trip 180 causing trip 180 to reclose the circuit breaker 185 thus returning the circuit operation to normal.

A trip timer 155 is provided to create a time delay that can delay the opening of breaker 185 for a predetermined power source correction period, e.g., up to several seconds to prevent the circuit breaker 185 from being tripped due to transitory fluctuations and variances in the line voltage. Additionally, the system power supply 110 derives a low dc voltage from the power source 10 which is used to power all of the solid state components in the circuit breaker device 100. Although, the first preferred embodiment of this invention is designed to be implemented using digital techniques and incorporating a microprocessor and a solid state disconnect as breaker 185, this is not meant to be limiting as this circuit can also be implemented using solid state or discrete components or a mixture thereof.

The preferred embodiment of the present invention is designed to be implemented as a portable plug-in connector using the standard NEMA plug outlet configuration, represented by connectors 23 and 26, to interface the device 100 to the power source 10 and to additionally interface the load 20 to the circuit breaker device 100. Connectors 23 represent the interface of the device intended to be plugged into a wall outlet. Connectors 26 are representative of the connectors that attach the load device to the electrical circuit breaker 100 plug-in module. Additionally, the electrical circuit breaker 100 can be incorporated into the design of an extension cord device for connecting a load device to a power source using the same connector configuration described above. This arrangement allows the circuit breaker device 100 to be used in existing buildings without any costly installation or modification. Although FIG. 1 shows a circuit breaker device 100 in the form of a plug-in connector module, connected at the load, the same device can be easily modified by omitting connectors 23 and installed in the wiring of the building at the load device end. The circuit can similarly be modified and integrated by the manufacturer into a load device by omitting connectors 26.

The circuit breaker device can be tested by incorporating a normally closed push button switch between either of the buffers 140 or 145 and the subtractor 160 which, when depressed, will simulate a voltage loss in the system 30.

Figure 2:
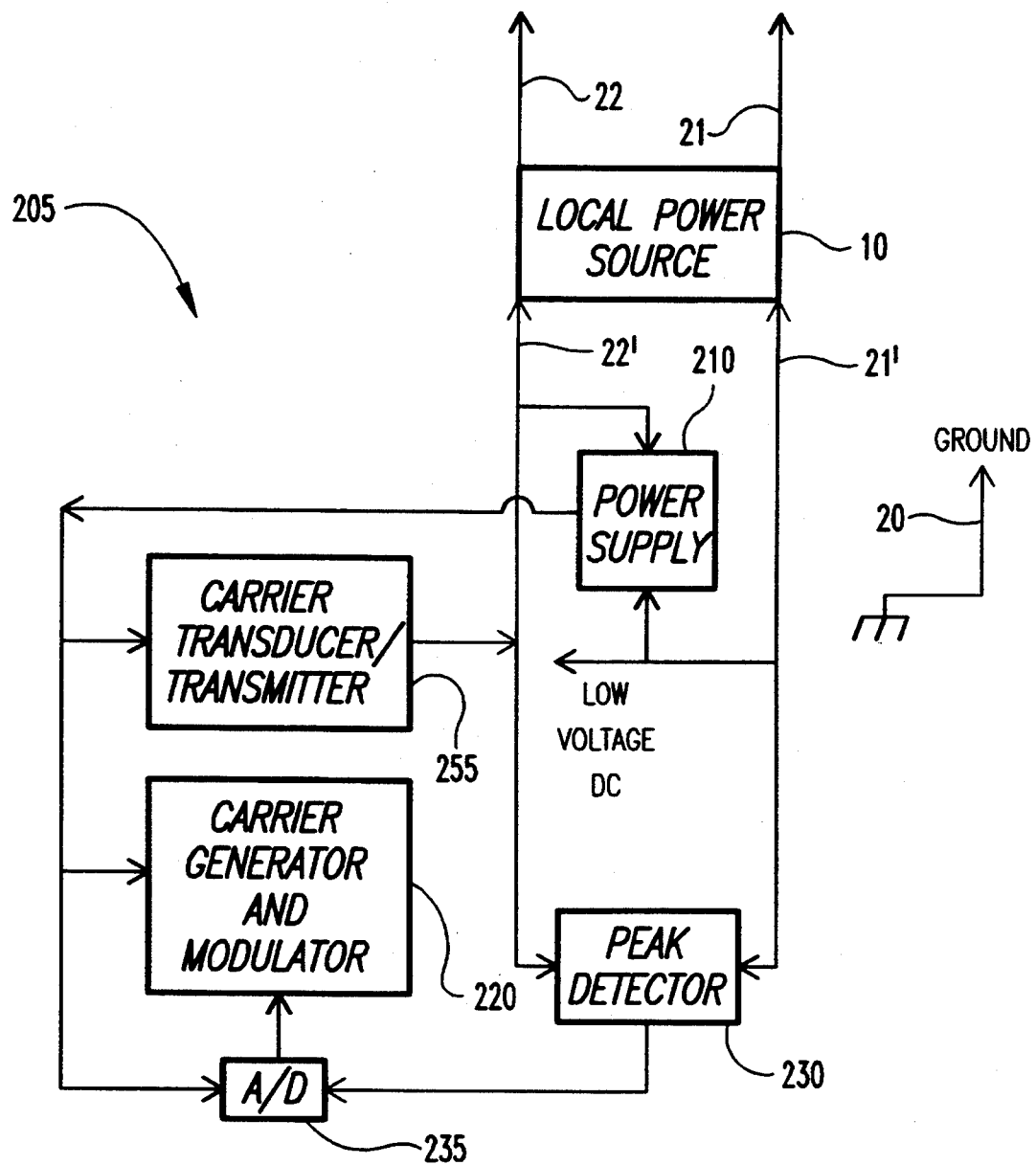
FIG. 2 is a diagram of a reference voltage transmitter portion of a second preferred embodiment of the present invention located near the source for relaying a voltage representative of the source voltage to the load end portion of the circuit breaker device.
Figure 3:
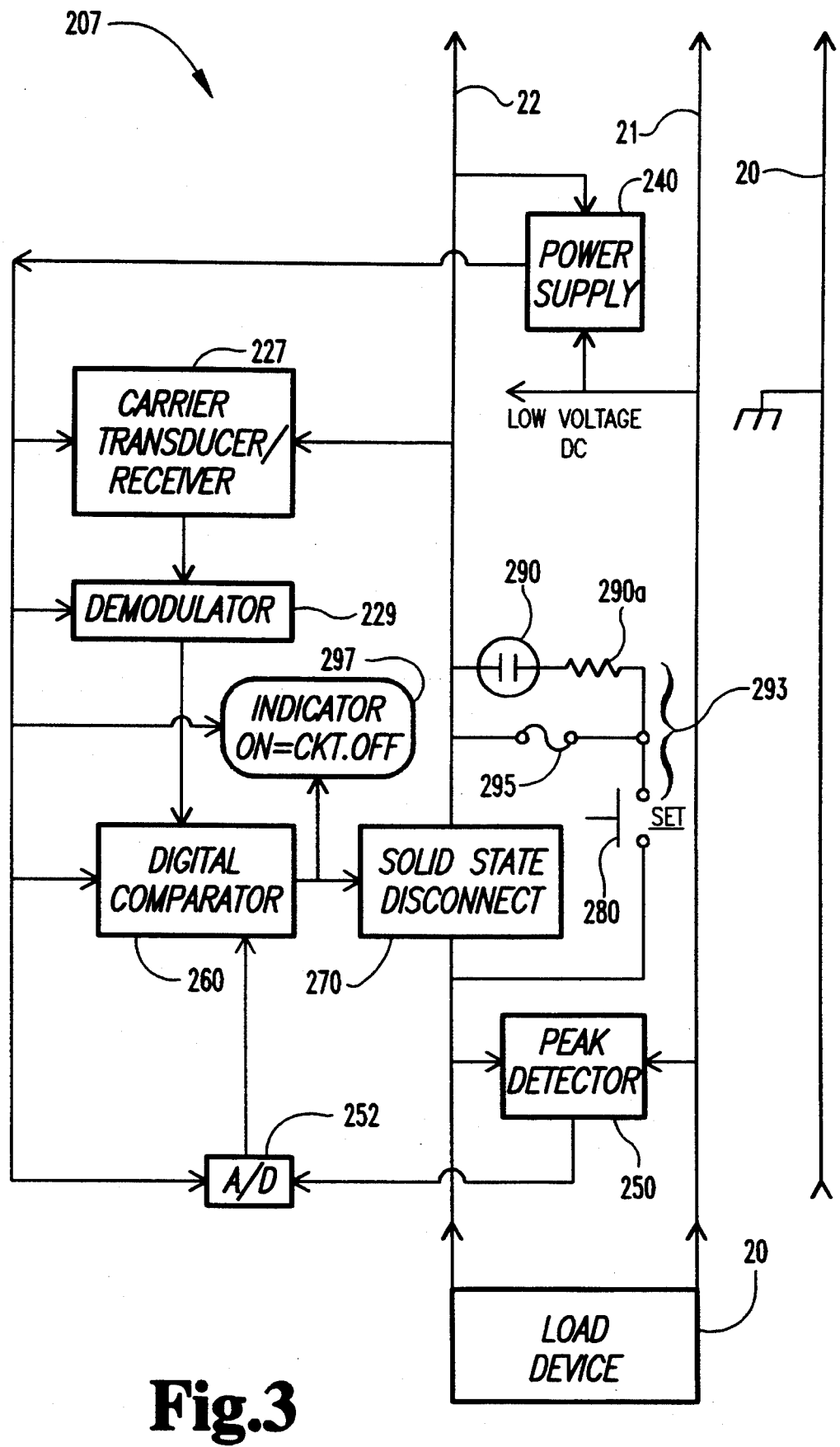
FIG. 3 is a diagram of the load end portion of the circuit breaker device of a second preferred embodiment of the present invention for detecting a wiring fault condition and disconnecting a load device from a power source using the reference voltage relayed from the reference voltage transmitter of FIG. 2.

Another preferred embodiment of the present invention is shown in FIGS. 2 and 3. This second embodiment operates following the same electrical principles discussed in connection with the first embodiment described above. More specifically, this embodiment of the present invention compares a voltage value obtained from the power source with a voltage drop value read from across the load device when the load device is "on". Any resulting voltage difference is attributed to a fault condition, typically resistance, present in the wiring connecting the power source and the load device. However, this second embodiment differs from the first in that the source voltage value is measured at the power source end of the wiring and only the load voltage drop value measurement is obtained at the load end of the system.

In FIGS. 2 and 3 there are shown two internal wiring conductors 21 and 22 for supplying power from a local power source 10 to a load device 20. A conductor 200 is also included to provide a ground path for the load device 10. Referring now to FIG. 2, there is shown a reference transmitter circuit 205 located at the power source end of the wiring, for obtaining and transmitting a reference voltage value. The reference transmitter circuit 205 is a dedicated circuit connected in parallel with the local power source 10 for the building via conductors 21' and 22' and is not used to power any load device not part of the reference transmitter circuit. A power supply 210 derives a low dc voltage from the local power source 10 that is used to power the elements of reference transmitter 205. Additionally, a peak detector 230 obtains a reference voltage value representative of the maximum source voltage value by obtaining a voltage measurement across the power source connected between internal wiring conductors 21 and 22. This maximum voltage value is digitized by analog-to-digital converter 235 and prepared for transmission to the load end portion 207 of the circuit breaker device. The reference voltage is relayed in digital form from the analog-to-digital converter 235 to a carrier generator and modulator 220 where the reference voltage is frequency modulated using FSK (frequency shift keying techniques) with a carrier to ready it for transmission. The modulated information is relayed to a carrier transmitter/transducer 225 which transmits the modulated waveform to a carrier receiver/transducer 227 (FIG. 3).

Referring now to FIG. 3, there is shown a load end portion 207 of a circuit breaker device, load end portion 207 being connected between the power source and the load device 20 at the load device end of the wiring. Carrier receiver/transducer 227 operates to retrieve the signal transmitted by carrier transmitter/transducer 225 (FIG. 2). The signal is retrieved by the carrier receiver/transducer 227 using phase lock loop detection of the carrier wave. The signal is relayed to demodulator 229 where the carrier wave is removed and discarded from the signal leaving only the reference voltage, which is relayed to the digital comparator 260.

Carrier transmitter/transducer 225 and carrier receiver/transducer 227 need not be radio transmitters but may, instead, be transducers that relay the reference voltage and the carrier signal via a line coupled with the internal power line wiring.

The load end portion 207 includes a peak detector 250 which obtains a maximum load end voltage drop measured in parallel across the load device 20. This load end voltage difference value is digitized by the analog-to-digital converter 252 and relayed to a digital comparator 260. Digital comparator 260 obtains a voltage difference representative of the difference between the source voltage at the power source end of the wiring and the load voltage at the load end of the wiring. Appropriate delays, either digital or analog, may be incorporated into the comparator inputs or output to preclude false disconnects due to transient conditions. If the voltage difference produced by the comparator 260 exceeds a predetermined threshold value indicating the presence of a moderate to high resistance or other kind of fault in the wiring, the solid state disconnect 270 opens internal wiring conductor 22 thus disconnecting the load device 20 from the power source 10.

Additionally, when the solid state disconnect 270 has opened the circuit, an indicator 297 will light to indicate the availability of power to the load if the disconnect protection were to be reset. A manually operated, normally open bypass switch 280 may be used to bypass the disconnect 270 momentarily for the purpose of resetting the protected outlet. An indicator type fuse 293, including a fuse 295 set to the load value and an indicator 290 connected in series with resistor 290a, is provided as part of the bypass circuit to protect against and indicate the presence of a shorted load device. If a fault is caused by a shorted load device, fuse 295 will blow and indicator 290 will light when a reset attempt is made.

As in the previous embodiment, the present invention may be implemented using discrete and mechanical components instead of digital, i.e. the solid state disconnect 270 can be replaced by a mechanical disconnect having mechanical reset capabilities. Additionally, although a carrier current coupled to the power line wiring is shown, the circuit breaker device may be implemented using a radio transmitter and receiver.

Figure 4:
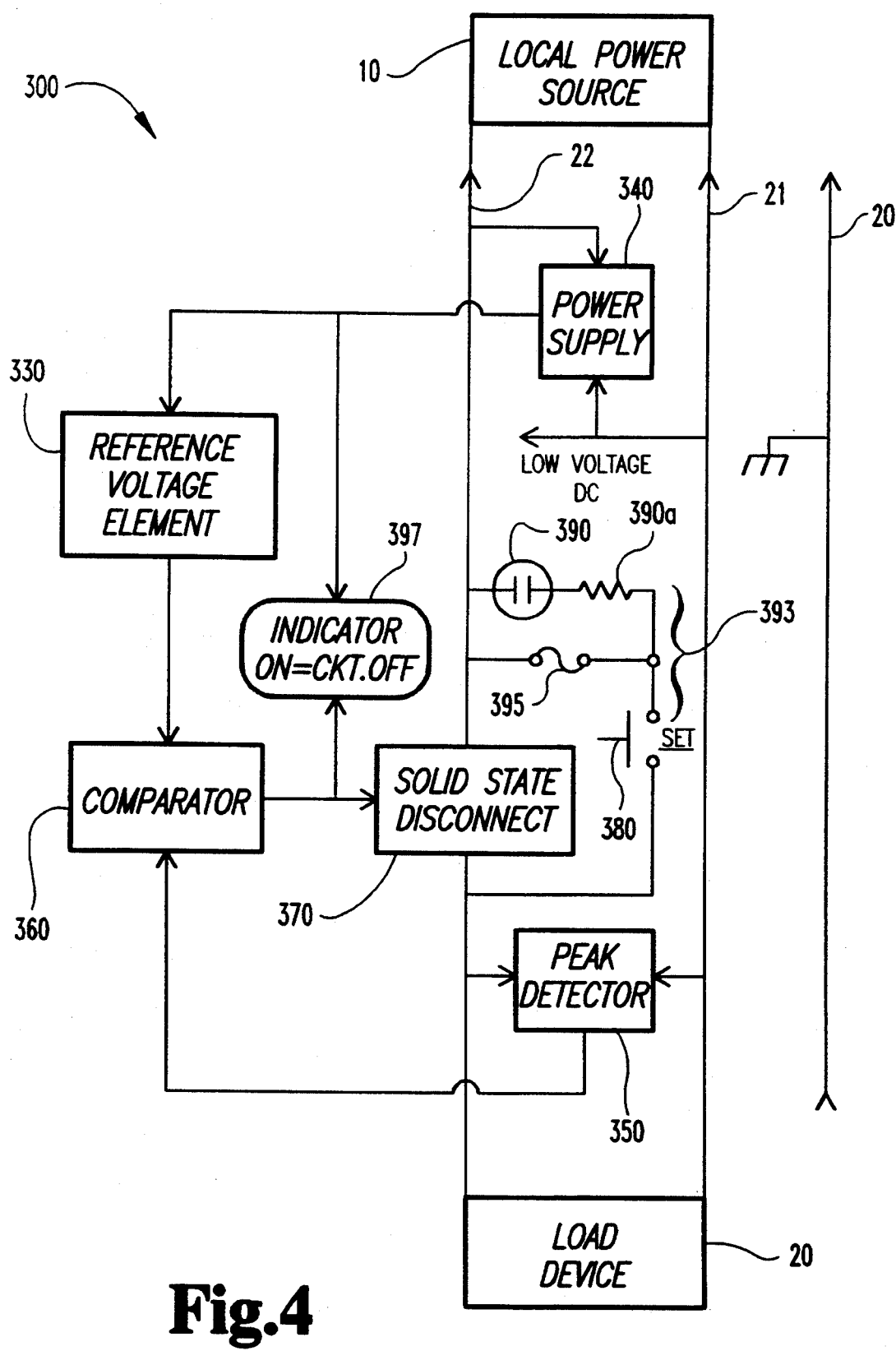
FIG. 4 is a diagram of the circuit breaker device of a third preferred embodiment of the present invention for detecting a wiring fault condition between a power source and a load device and for disconnecting the load device from the power source upon detection of such a fault.

Referring now to FIG. 4 there is shown a further embodiment of the present invention designed to operate using the same electrical principles as the first and second embodiments of the present invention. Electrical circuit breaker device 300 is connected between the power source and the load device 20 at the load device end of the wiring. Rather than obtaining a reference voltage at the power source end of the wiring, electrical circuit breaker device 300 utilizes an arbitrary reference value set by reference voltage element 330. Internal wiring conductors 21 and 22 connect a local power source 10 internal to a residence or other building in series with a load device 20. A power supply 340 derives a low dc voltage from the power source 10. This power supply 340 supplies a low dc voltage to the components of the circuit breaker device 300 and additionally provides a low reference voltage to the reference voltage element 330. Reference voltage element 330 allows an analog representation of the reference voltage above a preset value to pass to a comparator 360. In this preferred embodiment reference voltage element 330 includes a temperature stable zener diode.

Circuit breaker device 300 includes a peak detector 350 connected across the load device 20 to obtain a voltage representation of the maximum voltage drop across the load device. This analog voltage representation is sent to an analog comparator 360 where it is compared with the reference voltage from reference voltage element 330. If the result of the comparison at comparator 360 is above a predetermined level, solid state disconnect 370 will open internal wiring conductor 22 and the load device 20 will be disconnected from the power source 10 and indicator 397 will light.

The solid state disconnect 370 may be reset using normally open bypass switch 385 as described above in connection with manually resetting the second embodiment of the present invention. As described in connection with the second preferred embodiment, indicator fuse 393 having an indicator 390, resistor 390a and a fuse 395 is provided to indicate a shorted load device. Additionally, as described above, analog or digital timers can be added to delay a disconnect due to fleeting transitory variations in the voltage signal.

Although the above described embodiments have been described in connection with a system that detects voltages representative of the source and load voltages, the same circuit breaker device may be modified to compare a power measurement representative of the power supplied at the source end of the wiring with a power measurement obtained at the load end of the wiring to detect a relatively high resistance or other kind of fault present in the wiring between the source and the load. The same is true for a comparison of the current at the source with the current at the load to check for faults in the intervening wiring. One of the inventive features of the present invention is the comparison of one electrical parameter representative of that parameter appearing at the power source end of the wiring with a corresponding electrical parameter representative of that parameter appearing at the load device end of the wiring to detect a fault in the wiring. As such, the description of the preferred embodiments of the present invention are in no way meant to be limited to only those devices that obtain voltage measurements, as faults in the wiring can be detected by an electrical circuit breaker in the spirit of the present invention by comparing wattage and amperage measurements taken at each end of the wiring as well.

Figure 5:
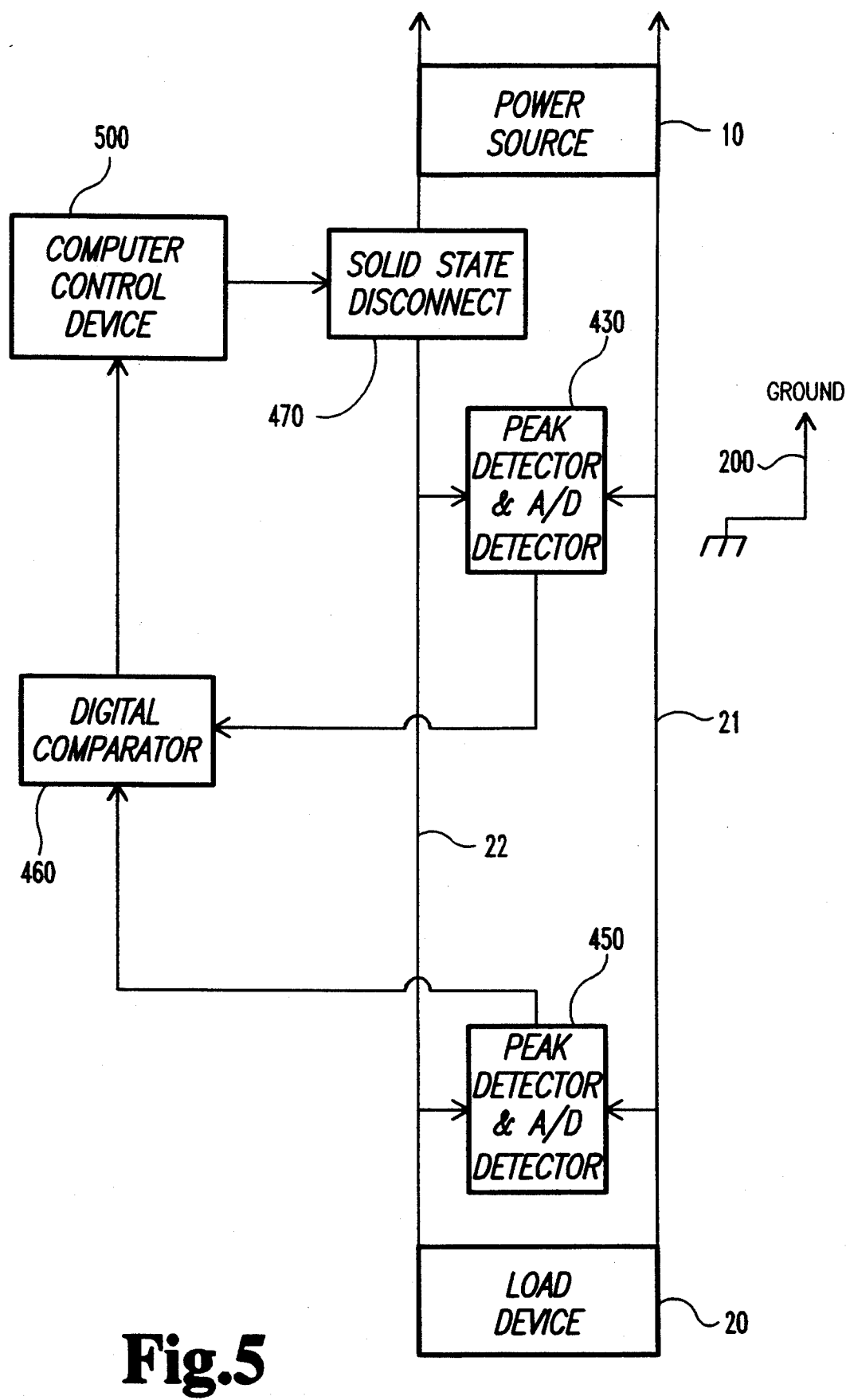
FIG. 5 is a diagram of the circuit breaker device in accordance with the preferred embodiment of tile present invention for detecting a wiring fault condition between a power source and a load device operable in connection with a computer control device for disconnecting the load device from the power source upon detection of such a fault.

Additionally, all three embodiments of the present invention described above (1) may be implemented as plug-in modules for use in existing buildings having existing wiring, (2) may be installed with the wiring of buildings while they are under construction, and/or (3) can be integrated (at least in part, with regard to the second embodiment) into the design of a load device or an extension cord device by a manufacturer. Additionally, as shown in FIG. 5, with some modification any of the three embodiments can be used in connection with a computer controlled disconnect system if that capability exists within the building in which the circuit breaker device has been installed. For example, the electrical circuit breaker device can be modified so that the signal resulting from the comparison stage can be routed to a computer for disconnection of the appropriate circuit and logging of the pertinent information regarding the disconnect signal.

Referring now to FIG. 5 there is shown a computer control device 500, installed within a building, that can be used to operate at least one solid state disconnect 470 to disconnect at least one load device 20 from a power source 10 upon detection of a fault condition within the wiring 21 and 22 between the power source 10 from the load device 20. Peak detector and A/D convertor 430 supplies the comparator 460 with a signal representative of the voltage at the power source while peak detector and A/D convertor 450 supplies the comparator 460 with a signal representative of the voltage drop across the load device 20. If the comparator 460 indicates that a line fault above a predetermined level is present, computer control device 500 will operate the disconnect 470 and additionally store the fault condition within the computer control device for retrieval by an operator. Disconnect 470 may be a standard circuit breaker device used in connection with a computer controlled disconnect system and located within the circuit breaker box ordinarily incorporated in buildings and residences near the power source. The system shown in FIG. 5 can be modified and used with any of the preferred embodiments of the present invention described above.

Finally, the above three embodiments will also work with 220 volt power sources and load devices by adding a second disconnect to disconnect both wires carrying power to the load device.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An electrical circuit breaker apparatus for disconnecting power supplied to a load device by a power source by way of internal wiring conductors of a building, comprising:

detecting means for producing a first signal representative of an electrical parameter near the power source when the load device is turned "off" and for producing a second signal representative of a corresponding electrical parameter near the load when the load is turned "on";

comparator means for producing a third signal responsive to a difference between said first and second signals; and disconnect means for responding to said third signal to open the circuit to said load in response to at least series resistive fault conditions in the internal wiring between the source and the load.

2. The electrical circuit breaker apparatus of claim 1 wherein said third signal corresponds to a power value.

3. The electrical circuit breaker apparatus of claim 1 wherein said electrical parameter and said corresponding electrical parameter are both voltages.

4. The electrical circuit breaker apparatus of claim 3 wherein said first signal is obtained by measurement of a first voltage near said load device when said load device is in an open-circuited state and wherein said second signal additionally is obtained by measurement of a second voltage taken near the load device.

5. The electrical circuit breaker apparatus of claim 4 wherein said comparator means additionally comprises:

a first buffer means for storing a value representative of said first voltage;

a second buffer means for storing a value representative of said second voltage; and subtracting means for subtracting the value in said first buffer from the value in said second buffer to obtain a voltage difference value.

6. The electrical circuit breaker apparatus of claim 5 wherein said first buffer means is updated periodically.

7. The electrical circuit breaker apparatus of claim 6 wherein said second buffer means is updated continuously.

8. The electrical circuit breaker apparatus of claim 7 wherein said disconnect means additionally includes:

current sense means for sensing the value of a current along the wiring connecting the load device to the power source;

multiplication means for multiplying said current with said voltage difference value to obtain a power loss value; and trip means for breaking the series connection between the power supply and the load when said power loss value exceeds a threshold value.

9. The electrical circuit breaker apparatus of claim 8 wherein said second buffer means value is updated when said current sense means indicates that no current is flowing through said load device.

10. The electrical circuit breaker apparatus of claim 9 wherein said detecting means comprises:

peak detector means for detecting the peak values of said first and second voltages; and analog-to-digital converter means for converting said peak values to a digital representation of said peak values.

11. The electrical circuit breaker apparatus of claim 9 additionally comprising a time delay means for ensuring that said trip means does not open the circuit due to momentary voltage fluctuations.

12. The electrical circuit breaker apparatus of claim 8 wherein said trip means is a solid state device for opening the circuit between the load device and the power source.

13. The electrical circuit breaker apparatus of claim 8 additionally comprising an alert means for indicating that a fault condition is present.

14. The electrical circuit breaker apparatus of claim 13 wherein said alert means includes a sound-emitting device.

15. The electrical circuit breaker apparatus of claim 13 wherein said alert means includes a light-emitting device.

16. The electrical circuit breaker apparatus of claim 1 additionally having a manual reset means for manually reconnecting said load device to said power source.

17. The electrical circuit breaker apparatus of claim 16 wherein said manual reset means will not allow sustained manual reconnection of said load device if said third signal has a value above a predetermined limit.

18. The electrical circuit breaker apparatus of claim 1 wherein said detecting means comprises:
first voltage detection means for obtaining a value representative of a first voltage; and
second voltage detection means for obtaining a value representative of a second voltage.

19. The electrical circuit breaker apparatus of claim 18 wherein said first voltage detection means is located at said power source remote from said second voltage detection means and wherein said second voltage detection means is located near said load device and wherein said first voltage detection means and said second voltage detection means are separated by the wiring between said power source and said load device.

20. The electrical circuit breaker apparatus of claim 19 wherein said first voltage detection means comprises:
first value detection means for obtaining the value of the first voltage at the power source;
analog-to-digital conversion means for creating a digital representation of said first voltage; and
relaying means for relaying said digital representation to said comparator means.

21. The electrical circuit breaker apparatus of claim 20 wherein said second voltage detecting means comprises:
second value detection means for obtaining the value of the second voltage remote from said power source and near said load; and
analog-to-digital conversion means for supplying said comparator means with a digital representation of said second voltage.

22. The electrical circuit breaker apparatus of claim 21 wherein said disconnect means operates to open the circuit between the load device and the power source when said third signal from said-comparator means is greater than a predetermined threshold value.

23. The electrical circuit breaker apparatus of claim 22 additionally comprising decoding means located near the load device for decoding a reference signal sent from said relaying means and sending said reference signal to said comparator means.

24. The electrical circuit breaker apparatus of claim 23 wherein said relaying means includes a transmitter and said reference signal is encoded and transmitted from said first voltage detection means to said decoding means.

25. The electrical circuit breaker apparatus of claim 24 wherein said decoding means includes:
a receiver for receiving said transmitted reference signal; and
a demodulator for decoding said transmitted reference signal.

26. The electrical circuit breaker apparatus of claim 23 wherein said reference signal is sent via a separate data line coupled with said wiring.

27. The electrical circuit breaker apparatus of claim 23 additionally comprising a time delay means for ensuring that said disconnect means does not open the circuit due to momentary voltage fluctuations.

28. The electrical circuit breaker apparatus of claim 23 additionally comprising an alert means for indicating that a fault condition is present.

29. The electrical circuit breaker apparatus of claim 22 additionally comprising a resetting means for manually bypassing said disconnect means when reconnecting said load device to said power source after disconnection has occurred.

30. The electrical circuit breaker apparatus of claim 18 additionally comprising a power supply for supplying a reference voltage to said first voltage detection means.

31. The electrical circuit breaker apparatus of claim 30 wherein said first voltage detection means is a zener diode for passing only voltage values above a predetermined level to said comparator means.

32. The electrical circuit breaker apparatus of claim 30 additionally comprising an alert means for indicating that a fault condition is present.

33. The electrical circuit breaker apparatus of claim 30 additionally comprising a resetting means for manually bypassing said disconnect means when reconnecting said load device to said power source after disconnection has occurred.

34. The electrical circuit breaker apparatus of claim 30 additionally comprising a time delay means for ensuring that said disconnect means does not open the circuit due to momentary voltage fluctuations.

35. The electrical circuit breaker apparatus of claim 1 additionally comprising source outlet connector means for connecting said apparatus to a power source and load connector means for connecting said load device to said apparatus.

36. The electrical circuit breaker apparatus of claim 35 wherein said source connector means is adapted for connection with a standard electrical wall outlet.

37. The electrical circuit breaker apparatus of claim 1 which additionally includes a computer controlled disconnect system including a computer control means for instructing said disconnect means to open the circuit to said load upon detection of a line fault condition and wherein said disconnect means is part of said computer controlled disconnect system.

38. The electrical circuit breaker apparatus of claim 1 wherein said apparatus is installed as part of the internal wiring of a residence or other building.

39. The electrical circuit breaker apparatus of claim 1 which additionally includes a current sensor and said comparator means is responsive to said current sensor.

40. An electrical circuit breaker apparatus for disconnecting power supplied to a load device by a power source by way of internal wiring conductors of a building, comprising:
voltage detection means for obtaining a first voltage representative of the voltage at the power source when the load device is turned "off" and for obtaining a second voltage representative of the voltage drop across the load obtained when the load device is "on";
subtractor means for obtaining a voltage difference between said first and second voltages;

multiplier means for multiplying said voltage difference by the current flowing through the load device to obtain a power loss value indicative of the power loss due to a Series resistance present in internal wiring connecting the load device in series with the power source; and, disconnect means for disconnecting said load device from said power source if said power loss value is above a predetermined level.

41. The electrical circuit breaker apparatus of claim 40 additionally comprising timer means for delaying said disconnect means from disconnecting said load device for a predetermined power source correction period to prevent disconnection due to transitory voltage fluctuations.

42. An electrical circuit breaker apparatus located near a load device for disconnecting power supplied to a load device by a power source due to an electric fault condition within the internal wiring connecting the power source in series with the load device in a building, comprising;

first voltage detection means for obtaining a reference voltage by measuring the voltage drop across the load device when the load device is turned "off";

second voltage detection means for obtaining a second voltage value representative of the voltage drop across the load device when the load device is turned "on";

comparator means for obtaining a voltage difference representative of the voltage difference between said first and second voltages; and disconnect means for disconnecting said load device from said power source if said voltage difference is above a predetermined level.

43. The electrical circuit breaker apparatus of claim 42 additionally comprising timer means for delaying said disconnect means from disconnecting said load device for a predetermined power source correction period to prevent disconnection due to transitory voltage fluctuations.

* * * * *

UNITED STATES PATENT AND TRADEMARK OFFICE
CERTIFICATE OF CORRECTION

PATENT NO. : 5,424,894
DATED : June 13, 1995
INVENTOR(S) : Briscall et al.

It is certified that error appears in the above-identified patent and that said Letters Patent is hereby corrected as shown below:

Column 3, Line 14; please change "tile" to "the"

Signed and Sealed this

Third Day of October, 1995

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,424,894

DATED : June 13, 1995

INVENTOR(S) : Briscall et al.

It is certified that error appears in the above-identified patent and that said Letters Patent is hereby corrected as shown below:

Cover Sheet, Item [21], please change Appl. No. "890,652" to "980,652".

Signed and Sealed this

Twenty-seventh Day of February, 1996

Attest:

BRUCE LEHMAN

Attesting Officer     Commissioner of Patents and Trademarks